Jan. 20, 1931. G. E. STEPHENSON 1,789,786
PLOW
Filed Sept. 14, 1929  2 Sheets-Sheet 1
Fig. 1.
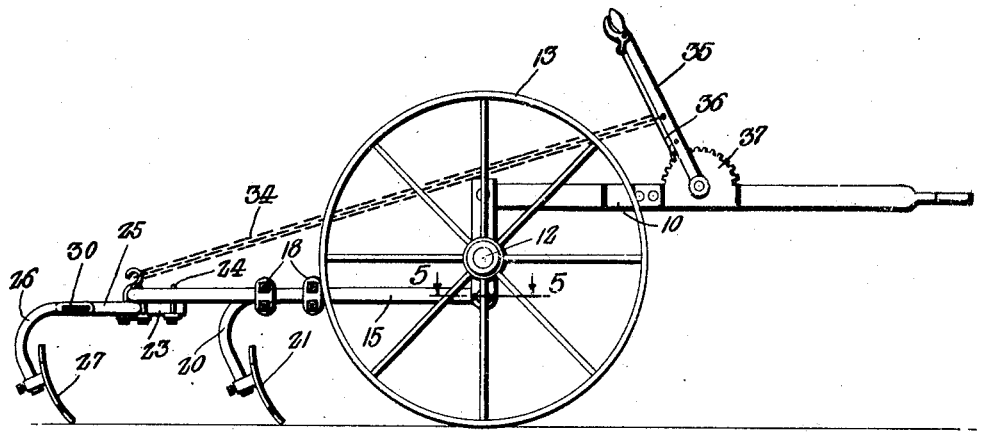
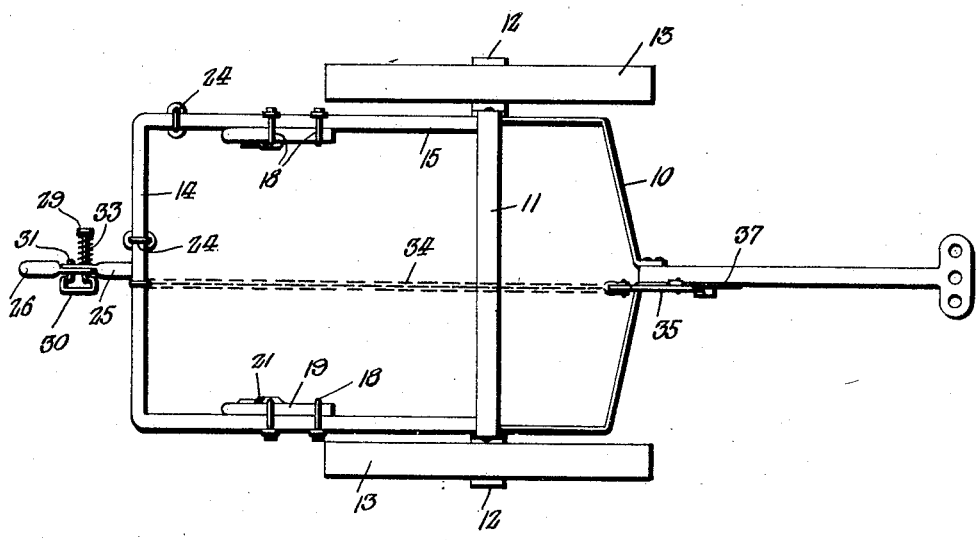
Fig. 2.
G. E. Stephenson,
INVENTOR
BY Victor J. Evans
ATTORNEY Jan. 20, 1931.  G. E. STEPHENSON  1,789,786
PLOW
Filed Sept. 14, 1929  2 Sheets-Sheet 2
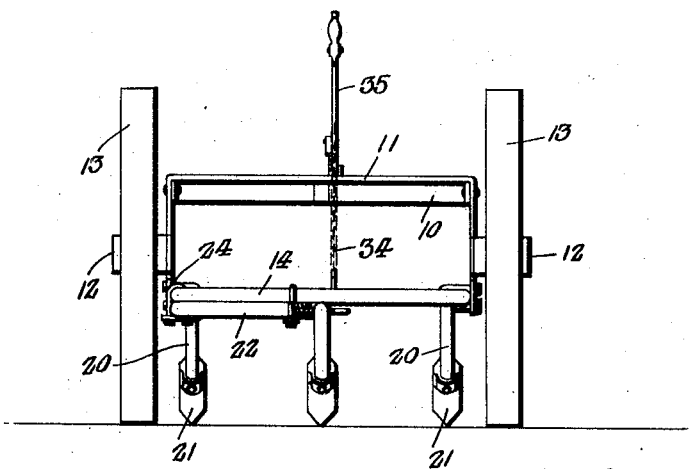
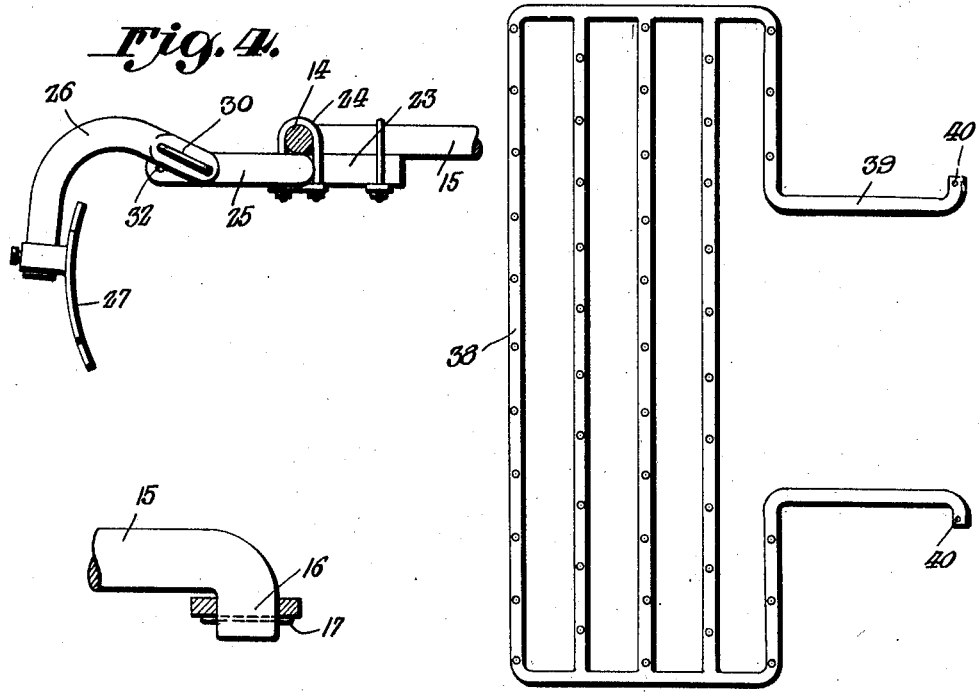
G. E. Stephenson,
INVENTOR
BY Victor J. Evans
ATTORNEY Patented Jan. 20, 1931

1,789,786

UNITED STATES PATENT OFFICE

GROVER E. STEPHENSON, OF BENTON, TENNESSEE

PLOW

Application filed September 14, 1929. Serial No. 392,557.

The present invention contemplates the provision of a cultivator, wherein the cultivator shoes can be adjusted to regulate the number of furrows or the depth of the furrows, while the machine is also constructed to permit the use of other implements therewith such as harrows, weeders and the like.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the invention.

Figure 2 is a top plan view.

Figure 3 is a rear elevation.

Figure 4 is a fragmentary detail view showing the manner of adjusting one of the shovels.

Figure 5 is a sectional view on line 5—5 of Figure 1.

Figure 6 is a plan view of a harrow constructed for association with the machine.

Referring to the drawings in detail 10 indicates the frame of the machine which includes a transverse end member 11 which is substantially inverted U-shaped, with its extremities depending an appreciable distance beneath the side members of the frame, and terminating to provide openings for a purpose to be hereinafter described. The axle is indicated at 12 and mounted on this axle are ground wheels 13.

The cultivator includes a frame 14 which is U-shaped in plan, and the parallel side portions 15 have their extremities offset as at 16 to be received by the openings in the depending portions of the transverse member 11. A cotter pin or the like 17 is passed through the offset extremities 16, so that the cultivator frame is mounted for vertical adjustment toward and away from the ground. Clamped in any suitable manner as at 18 on each side member of the frame 14 is a shovel support 19 including a downwardly curved portion 20 to which a cultivator shovel 21 is attached in any suitable manner. Arranged at the rear of the frame 14 is an additional shovel support including a portion 22 arranged beneath the transverse member of the frame 14, and a portion 23 arranged beneath and parallel with one of the side members of said frame, both of which are clamped to the respective portions of the frame by the clamps 24. The latter mentioned support includes an extension 25 which projects rearwardly of the frame 14 from one end of the portion 22, and this extension has pivotally mounted thereon the curved shank 26 of an additional shovel 27. A spring influenced pin 29 is passed through the extension 25 and a slot in shank 26 and is formed with a substantially U-shaped hand hold 30, one end of which indicated at 31 is also adapted to pass through the shank 26 and through an opening 32 in the extension 25. The spring for this fastening device is indicated at 33.

By reason of this construction it is manifest that the shovel 27 with the shovels 21 can be used to lay off furrows, and the depth of the furrows can be regulated by adjusting the frame 14 with relation to the ground through the instrumentality of a chain 34 connected with a hand actuated lever 35. The lever is provided with a pawl 36 which cooperates with a ratchet 37 to hold the frame in its given position. However, the shovel 27 can be raised above the ground, by removing the extremity 31 of the locking pin from the slot 28, and subsequently passing said extremity 31 through the opening 32 in the extension supporting the shovel in the position illustrated in Figure 4. With the shovel 27 elevated, the other two shovels 21 can be used to cover the furrows by moving between the latter.

The cultivator frame and its associated parts can be conveniently removed from the wheeled frame and various other types of implements used in conjunction therewith, such as a harrow, rake or the like. It is only essential that the frame of the specific implement employed be provided with offset extremities to be received by the openings in the depending portions of the transverse member 11 of the frame.

In Figure 6 I have illustrated a harrow indicated generally at 38 and provided with parallel extensions 39, the extremities of which are offset as at 40 for association with the wheeled frame of the machine in the same manner in which the cultivator frame is attached thereto.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A machine of the character described comprising a wheeled frame, a cultivator frame detachably associated therewith, means for adjusting the cultivator frame toward and away from the ground, cultivator shoes supported at the sides of the frame, a support projecting rearwardly from the frame, a cultivator shoe having a shank pivotally mounted on the support, said shank being longitudinally slotted, a spring pressed bolt supporting the shank upon the support, and a substantially U-shaped extremity formed on the bolt and having its one limb passed through the shank in the support to hold the cultivator shoe fixed in a given position with relation to the support.

2. A machine of the character described comprising a wheeled frame, a substantially U-shaped cultivator frame detachably associated therewith, means for adjusting the cultivator frame toward and away from the ground, cultivator shoes supported by the sides of the frame, a substantially Z-shaped rod having a portion arranged beneath one side of the cultivator frame and a portion beneath the transverse member thereof, and an extremity projecting rearwardly from the frame, a cultivator shoe including a shank pivotally mounted on the rearwardly projecting portion and independently adjustable toward and away from the ground, and spring influenced means for holding the shoe fixed with relation to said rod in a given position.

In testimony whereof I affix my signature.

GROVER E. STEPHENSON.